April 6, 1937. H. L. JOHNSTON 2,075,851
FOOD HANDLING APPARATUS
Filed April 7, 1934 2 Sheets-Sheet 2
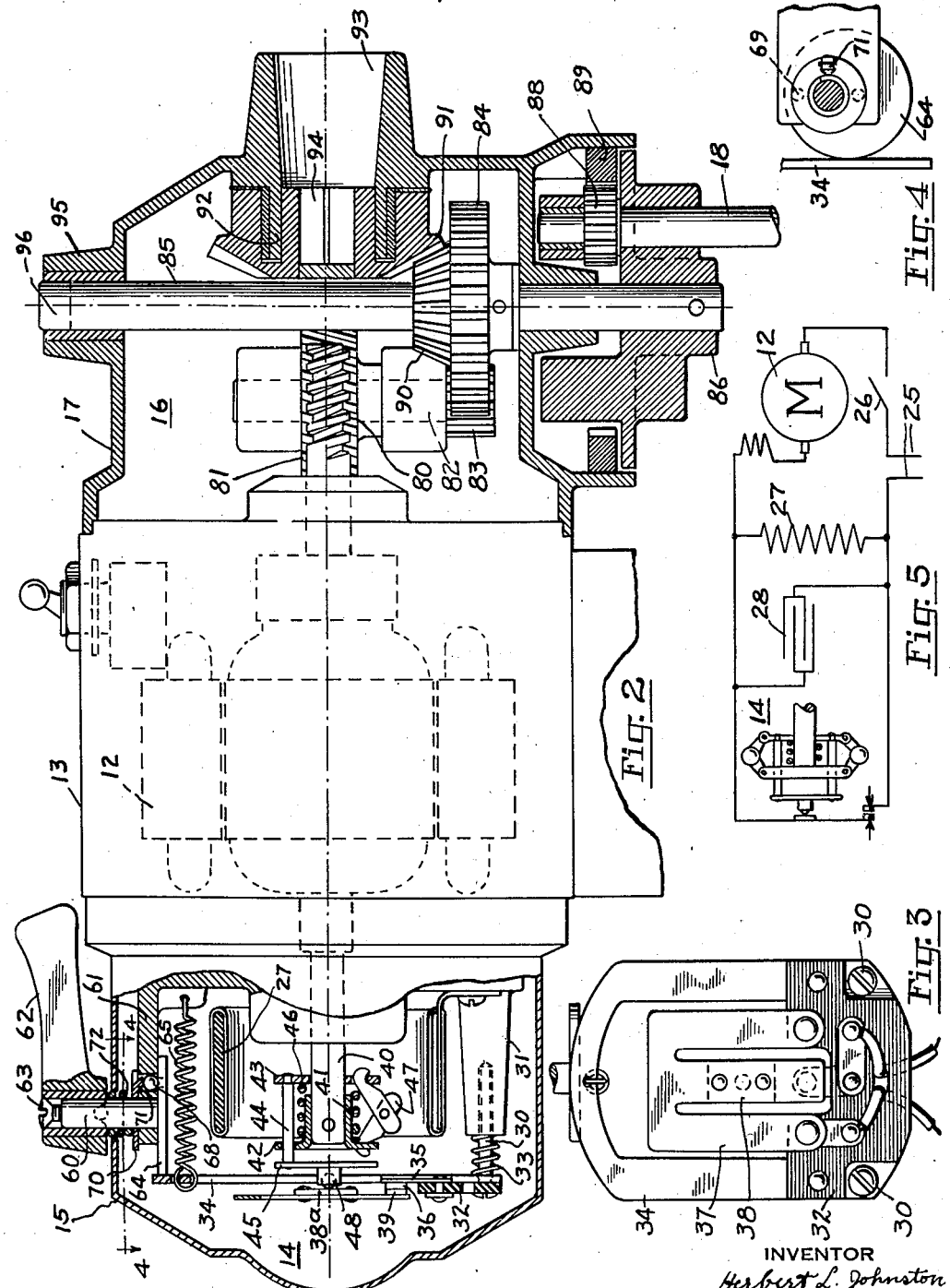
INVENTOR
Herbert L. Johnston
BY Maréchal & Noe
ATTORNEY Patented Apr. 6, 1937

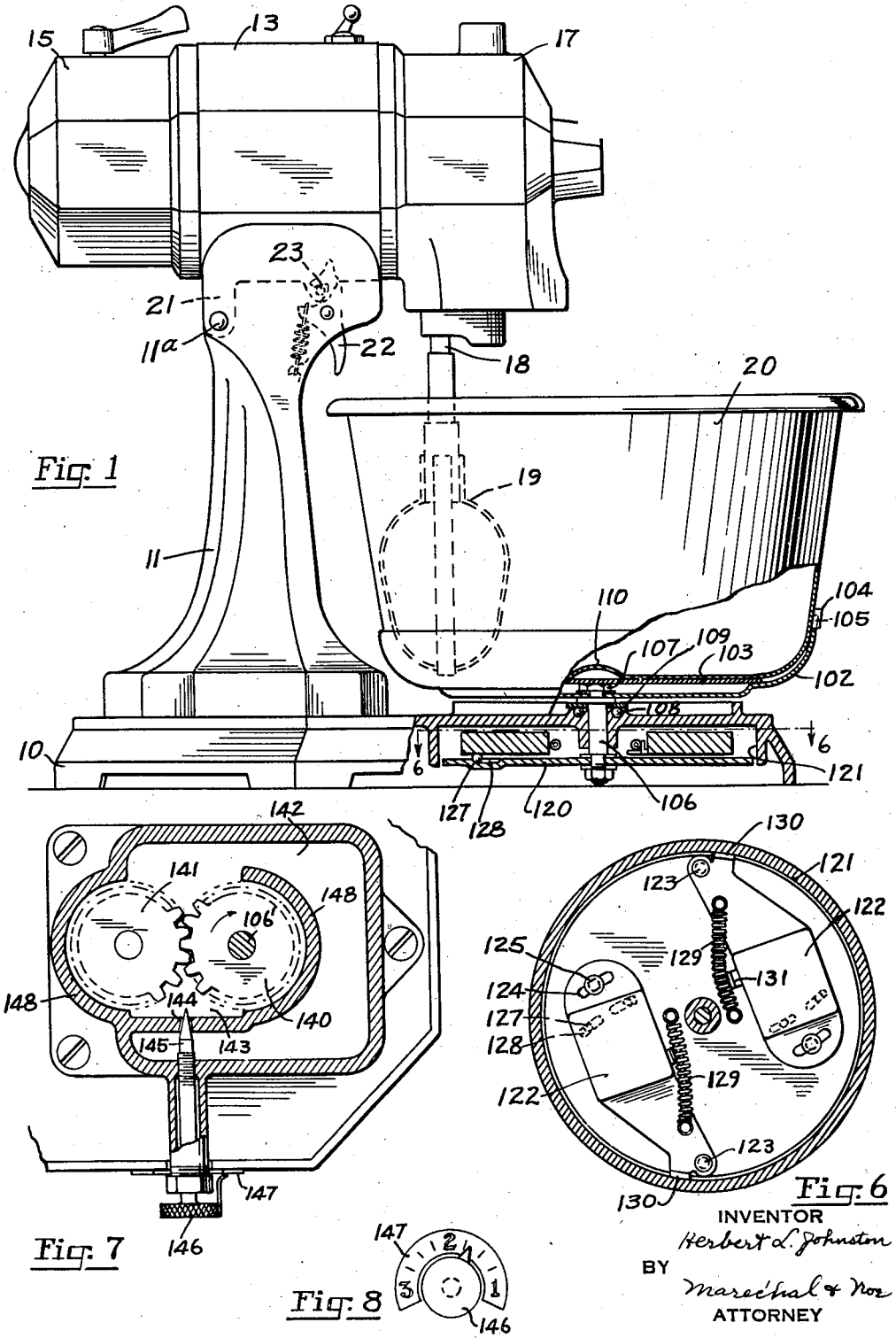

2,075,851

UNITED STATES PATENT OFFICE 2,075,851

FOOD HANDLING APPARATUS

Herbert L. Johnston, Troy, Ohio, assignor to The KitchenAid Manufacturing Company, Troy, Ohio, a corporation of Ohio Application April 7, 1934, Serial No. 719,491

12 Claims. (Cl. 259—85).

This invention relates to food handling apparatus.

It is the principal object of the invention to provide a food handling device suitable for domestic use which will perform a large number of different operations involved in the handling of food, which will be operable over a relatively wide range of speeds, which will have suitably high torque at any such speed, and which will be simple and inexpensive in construction.

It is a further object to provide food handling apparatus of this character having a beater arm operating within a bowl which is mounted for rotation with means for separately controlling the speed of operation of both the beater and the bowl.

It is a further object to provide food handling apparatus comprising a planetary type beater arm cooperating with a freely rotatable bowl.

It is a further object to provide a simple and effective speed control for food handling apparatus of this character which will provide the desired speed range and the desired torque throughout the speed range.

Other objects and advantages will be apparent from the description, the accompanying drawings, and the appended claims.

In the drawings,—

Fig. 1 is a view in side elevation, with certain parts being broken away, of a machine constructed in accordance with the present invention;

Fig. 2 is a view partially in elevation and partially in section of the upper portion of the machine showing the motor, speed control mechanism, and transmission gearing;

Fig. 3 is an end elevational view of a portion of the speed control mechanism;

Fig. 4 is a horizontal sectional view on the line 4—4 of Fig. 2;

Fig. 5 is a circuit diagram of the motor and its speed control mechanisms;

Fig. 6 is a horizontal sectional view on the line 6—6 of Fig. 1, showing the controlling mechanism for controlling the rate of rotation of the bowl;

Fig. 7 shows a modified form of mechanism for controlling the bowl speed; and

Fig. 8 is an elevational view showing the control member of such modified construction of Fig. 7.

Referring to the drawings which disclose a preferred embodiment of the invention, there is shown a base 10 adjacent one end of which there is mounted the upstanding pedestal 11 carrying the transverse pivot shaft 11a. The drive mechanism embodies an electric motor 12 mounted within a casing section 13, speed control mechanism indicated generally at 14 enclosed within a casing section 15, and transmission gearing 16 enclosed within casing section 17. A work spindle 18 extends downwardly from the transmission casing 17, detachably carrying a beater element 19 in cooperative relation within a bowl 20.

The middle section 13 of the casing is formed with a depending lug 21 which is mounted upon shaft 11a to provide for the swinging of the entire drive and beater mechanism about the shaft 11a to remove the beater from the bowl. A spring pressed latch 22 mounted on the pedestal cooperates with a pin 23 carried by the casing 13 and provides for latching the drive mechanism in the horizontal operative position while permitting release thereof when desired.

Motor speed control mechanism is employed which provides for the operation of the device over a relatively wide speed range and for adequate torque of the motor throughout such speed range. The motor is preferably a series type motor which has inherently high torque characteristics, and a resistor is connected in series with the motor circuit and adapted to be cut into and out of circuit in response to the setting of a centrifugal speed control device to thereby effect regulation of the motor speed.

Reference is made to the circuit diagram of Fig. 5 which shows the power lines 25, main control switch 26, the motor 12, and the resistor 27 connected in series therewith. The centrifugal speed control device 14 is indicated diagrammatically, and is connected to short circuit the resistor upon a decrease in motor speed to a predetermined point. With the resistor short circuited, more energy is supplied to the motor and its speed increases. When the speed increases the centrifugal switch opens its contacts and the resistor is reinserted in the circuit, and the cycle is repeated. In practical operation the cycle takes place rapidly with the result that the motor speed is regulated within relatively close limits and maintained at such a value regardless of variation in normal load conditions on the motor. Condenser 28 reduces arcing at the contact point.

The speed control mechanism 14 comprises the following. A pair of studs 30 mounted upon stationary supporting members 31 provide a support for a plate 32 of insulating material. The plate is provided with openings of larger size than the studs 30 to permit limited tilting movement of the plate about the studs as pivots. Springs 33 urge the plate outwardly and yieldingly hold it against the heads of studs 30.

To the plate 32 there is fastened an upwardly extending frame 34 substantially U-shaped as shown. The plate carries also a centrally located arm 35 to which is attached a stationary contact member 36. A resilient three-pronged spring 37 is attached to the plate 32 and its centrally located depending tongue 38 is provided with a bearing plate 38a, and a contact 39 adapted to cooperate with the fixed contact 36. The construction of the spring member 37 is such that the tongue portion 38 is relatively easily flexible and can be deformed by application of pressure to plate 38a to cause a separation of contacts 36 and 39. Each of the members carried by the plate 32 is insulated from the other and electrical connection is made to the arm 35 and to the spring member 37 respectively so that upon the closing of contacts 36 and 39, the resistor 25 is short circuited as above indicated.

Mounted on the shaft 40 of the motor is a sleeve member 41 pinned thereto and rotatable therewith. The sleeve is provided with an outwardly flaring flanged portion 42. A disk 43 is slidably mounted upon the shaft and pins 44 are fastened into the disk 43 and extend through suitable holes in the flange 42 to form a supporting cage structure carrying an outer disk 45. Spring 46 overlying the sleeve 41 tends to cause axial movement of the cage structure inwardly along the shaft. A plurality of pivoted weights 47 are hooked respectively into the flange 42 and the disk 43 for opposing the spring pressure and urging the cage in the opposite direction in response to centrifugal force, the extent of movement of the cage axially of the shaft being proportional to the centrifugal force. An operating element or ball 48 is carried by the outer disk 45 and is adapted to contact with the plate 38a on tongue 38 to transmit the axial movement to the tongue member 38 and thereby to open the contacts 36, 39.

Means are also provided for adjusting the speed at which the motor will operate, this means comprising a device for adjusting the normal position of the frame so that it will be contacted by the element 48 under predetermined selective speed conditions. For this purpose a shaft 60 is rotatably mounted in a fixed portion 61 of the frame of the motor and an operating handle 62 attached thereto by means of screw 63. The shaft carries an eccentric disk 64 against which the frame 34 is held by means of a spring 65. Upon the rotation of handle 62 the eccentric disk is caused to turn causing tilting of the frame about its support on studs 30. Thus when the position of the frame 34 is changed by moving it toward the motor, a corresponding change is produced in the spacing between the bearing plate 38a and element 48 of the centrifugal device, these parts being moved closer together so that contacts 36, 39 will be operated at a lower speed and the mechanism will thus regulate the motor to a slower speed. The opposite regulation occurs when the frame is tilted away from the motor. This mechanism provides a highly efficient type of speed control, and provides for ready adjustment to any speed within the operating range. The motor operates at the predetermined speed regardless of variations in the normal work load.

Means are provided for retaining the operating handle in predetermined adjusted position, this means comprising a ball 68 held against rotation in a slot in the support 61 and urged downwardly toward a series of depressions 69 in the disk 64 by means of a washer 70 formed with a depending tongue 71 overlying the ball. A spring 72 normally forces the washer down into contact with the ball and tends to seat the ball in one of the depressions in the disk; upon the turning of the handle the disk is rotated and the ball then seated in one of the depressions to retain the mechanism in such adjusted position.

The control device 62 therefore provides means for adjusting the speed at which the motor will operate to any desired speed within a given range, the range being limited by the shape of the eccentric 64 to within safe operating limits. In case it is desired to vary the speed range the studs 30 may be adjusted in or out to thereby move the lower portion of the frame toward or away from the centrifugal device and thereby provide for the control of the motor speed within a different speed range. Ordinarily it is preferred to make the preliminary adjustment of the machine by properly setting the base of the frame upon the studs and thereafter to vary the speed within such range.

The drive shaft 40 of the motor extends into the transmission housing 17 and is provided upon its overhanging end with a worm 80 meshing with a worm gear 81. Gear 81 is mounted upon a shaft 82 which is supported in any convenient manner from the housing and provided with a pinion 83 which meshes with a gear 84. Gear 84 is mounted upon the vertical shaft 85 to the lower end of which there is attached the planetary head 86. The head 86 rotatably carries the work spindle 18 which is provided at its upper end with gear 88 meshing with stationary internal gear 89 to provide for planetary motion of the work spindle upon rotation of shaft 85.

Likewise fastened to shaft 85 is a bevel pinion 90 meshing with bevel gear 91. Gear 91 is rotatably mounted upon a projection 92 of the housing section 17 which is formed with a tapering socket 93. The gear 91 has a non-circular opening 94 to provide for receiving in driving relationship an attachment such as a meat mincing device or the like.

Shaft 85 likewise extends upwardly through and is journalled in a projection 95 formed at the top of housing section 17 which is likewise formed with an external taper and serves to receive attachments. A slot 96 in the top of the shaft 85 provides a driving connection for such attachments.

It will be evident from the above that all of the points where power is taken off, either from spindle 18, or from attachment connections 94 or 96, the driven parts are at all times in positive driving connection with the motor shaft and operate at speeds in fixed relationship to the motor speed. This provides therefore a very simple and satisfactory driving connection for all of these parts.

The bowl 20, within which the single beater 19 operates, is adapted to be supported in a rotatable manner upon the base 10. The means for supporting the bowl comprises a table 102 within which the bowl is adapted to seat. Preferably a rubber mat 103 overlies the bottom of the table to provide sufficient friction for driving the table from the bowl. If desired positive driving connections consisting of a lug 104 cooperating with a projecting member 105 on the table can be provided.

A shaft 106 is fastened to the bottom of the table by means of nut 107, the shaft extending downwardly through the base 10. Antifriction bearing members 108 cooperating with collar 109 may be provided to take up the thrust load of the bowl and provide for free rotation thereof about the axis of shaft 106.

As described above, the beater element 19 is adapted to have a planetary motion within the bowl. The parts are shown in Fig. 1 with the beater element at the side of the bowl, this being substantially the limit of its planetary movement toward the side of the bowl. Upon the movement of the beater to the innermost position of its planetary movement it extends approximately to the center of the bowl. Thus with its planetary motion, the beater operates and is effective over a complete radius of the bowl. Preferably the bottom of the bowl is upwardly curved at the center as shown at 110 to prevent collection of any untreated material in a pocket at the center.

As the beater element operates upon the work material in the bowl it is rotating on its own axis 18 and also in the opposite direction about the axis of shaft 85. The reaction on the work material is to some extent balanced, but the effect of the rotation of the beater on its own axis being considerably greater than that of the rotation of the planetary head, there is a resultant reaction which tends to cause rotation of the bowl. As the bowl turns, the entire body of the work material is brought repeatedly to the zone of operation of the beater element and is thus completely and uniformly treated.

It is highly desirable in a construction of this kind making use of a rotating bowl, that a planetary motion be provided. If the beating element is merely rotated about its own axis, material such as potatoes brought around by the rotating bowl may at first be merely knocked out of the way by the rotating beaters and it may require repeated contact with the beaters before the material is properly beaten down. With the present invention the movement of the planetary is such that the work material, in addition to being treated by a rotating beater, may be crushed between the beater and the side wall of the bowl by the planetary movement of the beater, and the entire food treating operation is thus made more efficient and requires less time.

The invention also provides means for controlling and limiting the speed of rotation of the bowl independently of the motor or beater speed. This means comprises a disk 120 fastened to the lower end of shaft 106. The disk is enclosed by an annular wall 121 formed integrally in the base of the machine. Upon the disk 120 are a pair of governor weights 122 pivotally attached thereto at 123. The weights are provided with guiding and motion-limiting slots 124 cooperating with pins 125 fixed in disk 120, and likewise are slidably supported upon bearing balls 127 which are rotatable in guide slots 128 formed in the disk. Springs 129 fastened respectively to the disk and to the weights normally tend to urge the weights into a retracted position, toward the center of the disk. In response, however, to centrifugal force, the weights tend to fly outwardly and urge the bearing surfaces 130 against the side wall 121 of the base to cause a braking action of the bowl. This action is automatically controlled in proportion to the speed of operation of the bowl so that as the speed increases the braking force also increases and the speed is thereby maintained within predetermined safe limits. A lug 131 is so located on each weight that as the weights are moved inwardly by the springs, the lugs will contact the springs 129 and act as a buffer to silence the action of the moving weights.

Means may be further provided for enabling the operator to manually control the speed of rotation of the bowl. As shown in Figs. 7 and 8, this means comprises a hydraulic pump including a pair of intermeshing gears 140, 141, the gear 140 being mounted upon the turn-table shaft 106' beneath the base of the machine. A casing 148 fits in fluid tight relationship around the periphery of the gears and also around their side faces, a reservoir 142 being provided for receiving a suitable fluid such as oil. A pressure chamber 143 is formed on the pressure side of the pump having an outlet 144 in which is positioned a needle control valve 145. The valve is operable by an external handle 146 which cooperates with a fixed index plate 147 to indicate the degree of adjustment of the control member.

The operation will be clearly understood from the above. In response to rotation of the beater element, the bowl is caused to rotate, causing corresponding rotation of pump gears 140, 141. As the gears rotate they take in a quantity of the braking fluid which is compressed in the pressure chamber by reason of the limited rate at which it can escape through the control valve. This produces a braking force which controls the rate at which the bowl is allowed to operate. The characteristic of such a pump is that, with any given setting of the control valve, its braking force varies rather sharply with a variation in speed, tending to increase rapidly with a small increase in speed. Consequently a pump of this character provides a control which will tend to restrain operation of the bowl to a predetermined speed range regardless of changes in the consistency of the material within the bowl. The speed of operation of the bowl can at any time be readily adjusted by operation of the control valve.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Food handling apparatus of the character described comprising a driving motor, a bowl, means for supporting said bowl providing for free rotation thereof, a beater operating in said bowl, and driving connections from said motor to said beater including a planetary transmission gearing, means in said gearing for rotating said beater on its axis, and means for rotating the beater axis about an axis positioned eccentrically of said bowl.

2. A food handling device of the character described comprising a motor, means for varying the speed of the motor, a bowl, means for supporting the bowl providing for free rotation thereof, a beater driven by said motor and operating in said bowl, and transmission means connecting said motor with said beater for driving said beater in said bowl to provide for rotation of said bowl by reaction on the contents thereof, said transmission means including means for rotating said beater on its own axis, and means for rotating the beater axis about an axis positioned eccentrically of said bowl.

3. Food handling apparatus of the character described comprising a driving motor, transmission gearing, a single planetary beater shaft, said transmission gearing including means for rotating said beater about its own axis, and means for rotating the axis of said beater about an axis spaced therefrom and in a direction opposite thereto, a beater mounted on said shaft, a bowl, means for supporting said bowl providing for rotation thereof as a result of reaction of said beater upon the work material in the bowl, and means for enabling the operator to manually control the rate of rotation of said bowl.

4. Food handling apparatus of the character described comprising a driving motor, a bowl, means for supporting said bowl providing for rotation thereof, a beater driven by said motor means for rotatably moving said beater in a directional radial of the bowl toward the wall of the bowl with a crushing action, said beater providing for rotation of the bowl by reaction on the work material therein, and means for limiting the rate of rotation of said bowl.

5. Food handling apparatus of the character described comprising a driving mo'or, a bowl, means for supporting said bowl providing for rotation thereof, a beater operating in said bowl, planetary means for driving said beater from said motor including means for rotating the beater axis about an axis spaced radially from the axis of the bowl, said beater causing rotation of said bowl by reaction on the work material therein, and manual means operable from a fixed portion of said apparatus for controlling the rate of rotation of said bowl.

6. Food handling apparatus of the character described comprising a driving motor, a bowl, means for rotatably supporting said bowl, a single beater driven by said motor operating in said bowl and providing for rotation of said bowl by reaction on the work material therein, means including a planetary transmission for operating said beater in said bowl with a planetary motion, means for varying the speed of operation of said beater in said bowl, and means independent of said speed varying means for regulating the speed of rotation of said bowl.

7. Food handling apparatus of the character described comprising a driving motor, a bowl, means for rotatably supporting said bowl, a beater of less lateral extent than the radius of the bowl, means for operating said beater in said bowl to provide for cyclic movement thereof from the center of the bowl toward the wall thereof with a crushing action comprising means for rotating the beater on its axis, and means for rotating the beater axis about an axis positioned between the center and the wall of said bowl.

8. Food handling apparatus of the character described comprising a base, a driving motor and a bowl supported on said base, means for rotatably supporting said bowl, a beater driven by said motor operating within said bowl, planetary means for causing said beater to rotate on its own axis and for causing rotation of the beater axis in the opposite direction, said beater providing for rotation of said bowl by reaction on the work material therein.

9. Food handling apparatus of the character described comprising a driving motor, a bowl, means for supporting said bowl providing for free rotation thereof, a beater driven by said motor operating in said bowl and adapted to produce rotation of said bowl by reaction on the work material therein, means for controlling the rate of rotation of said bowl comprising a braking device, and means operable during rotation of said bowl for controlling said braking device to regulate the speed of rotation of said bowl.

10. Food handling apparatus of the character described comprising a driving motor, a bowl, and means for supporting said bowl providing for free rotation thereof, a beater driven by said motor operating in said bowl with a planetary motion and adapted to produce rotation of said bowl by reaction on the work material therein, means for controlling the rate of rotation of said bowl comprising a hydraulic pump, and means for varying the load on said pump to control the rate of rotation of said bowl.

11. Food handling apparatus of the character described comprising a base, a bowl, means for mounting said bowl on said base providing for free rotation thereof, a pedestal mounted on said base, a motor power unit pivotally supported on said pedestal in overhanging relation with respect to said bowl, a beater element carried by said motor power unit and adapted to be lifted out of said bowl when the power unit is pivoted on its support, and planetary gear means interconnecting said driving motor and said beater and providing for the operation of said beater within said bowl, said means including means for rotating the beater on its own axis and for rotating the beater axis about a center spaced from the axis of the bowl to provide for obtaining a crushing action of the beater with respect to the wall of the bowl, said beater providing for the rotation of said bowl by reaction on the work material therein.

12. Food handling apparatus of the character described comprising a driving motor, a bowl, means for rotatably supporting said bowl, a beater driven from said motor, means for rotating the beater on its axis, means for effecting rotation of the beater axis about an axis intermediate the wall of the bowl and the center thereof, said beater providing for rotation of said bowl by reaction on the work material therein, means for controlling the rate of rotation of said bowl comprising cooperating stationary and movable braking surfaces, and means for effecting frictional engagement between said surfaces to effect control of the speed of rotation of the bowl.

HERBERT L. JOHNSTON.